Figure 1:
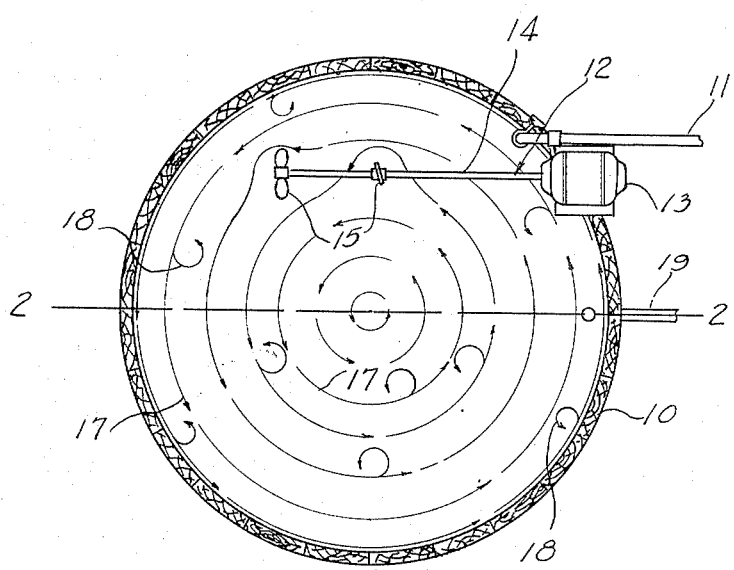

INVENTOR
Norman C. Fischer
BY Carl C. Batz
ATTORNEY

Patented Apr. 8, 1941

2,237,827

UNITED STATES PATENT OFFICE 2,237,827

TREATMENT OF EGG WHITES

Norman C. Fischer, Springfield, Mo., assignor to Armour and Company, Chicago, Ill., a corporation of Illinois Application October 18, 1939, Serial No. 299,931

5 Claims. (Cl. 99—210)

This invention relates to the production of dried egg whites and deals particularly with the treatment of the egg whites prior to drying in order to improve the quality of the dried product.

Dried egg whites are now being used in increasing amounts in baking, candy manufacture, etc., and the extent of such use seems to be limited only by the ability of the manufacturer to make a high quality product which when reconstituted will whip readily with a stable foam of large volume, which has good taste, odor and color characteristics, and which has substantially all the qualities of the fresh egg whites. It is well known that untreated fresh egg whites when dried will not whip well when again reconstituted, and treatment of some kind is necessary.

In some of the prior methods for treating egg whites preparatory to drying the whites are held for an extended period of time so that fermentation takes place, and this procedure enables the whipping of the dried egg product when reconstituted with water. The process described in my copending application Serial No. 287,622, filed July 31, 1939, is such a process and involves the fermentation of the eggs under acid conditions. Other processes avoid fermentation and impart whipping qualities by other means. For example, the processes described in Rosner Patent No. 2,059,399 and Fischer No. 1,996,800, utilize acid for imparting whipping qualities.

In practically all of the processes for treating egg whites prior to drying, a scum rises to the surface of the egg white liquid, this scum consisting of certain insolubles such as egg chalaza and stringy portions of the egg white. In prior processes it has been customary to separate off this scum and discard it, and this factor represents a serious waste of material. These insolubles have nutriment values equal to the remainder of the egg white and any method or treatment by which these materials can be successfully dried along with the remainder of the egg white mass is of great commercial importance.

An important object of this invention is to provide a method and apparatus for dispersing the insoluble scum throughout the egg white mass, so as to enable it to be dried along with the remainder of the egg white material. It is also desired that the improvement be applicable to any process for treating egg whites for drying wherein insolubles tend to separate from the egg white mass.

I have discovered that a very effective way to treat the egg white where insolubles are involved is to circulate the egg white mass in a whirling movement so as to create vortex formations on the surface of the liquid. This may be accomplished by placing the egg whites in a vat of circular cross section and then propelling the egg liquid about the vat in a whirling movement. This procedure creates small and large whirlpools and serves effectively to disperse the insolubles throughout the mass.

Figure 2:
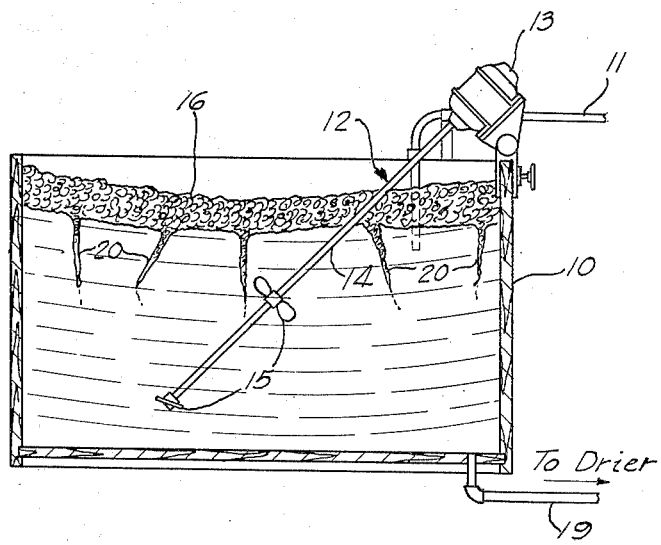

The specific features and benefits of my improvement will be more readily understood after the following detailed explanation, taken with the accompanying drawing in which:

Figure 1 is a plan view of apparatus suitable for carrying out the invention including the vat of circular cross section; and Figure 2 is a vertical sectional view taken at line 2—2 of Figure 1, showing the vat filled with circulating egg material.

Though the invention is applicable to many methods of egg white treatment, for the purpose of explanation, I will describe its use in connection with the method disclosed in my copending application Serial No. 287,622.

To take a specific example, a large wooden vat 10 of circular cross section may be filled with 15,000 pounds of fresh egg whites. To this may be added 102 pounds of hydrochloric acid of 37.0 to 38.5% concentration diluted with 4 to 5 parts of water. This acid may be added as through a tube 11. While the acid is being added the egg whites may be agitated with the motor driven device 12 mounted on the side of the vat 10. This device 12 may comprise a motor 13 having an extended shaft 14 provided with the propellers 15. As the acid is added this device operates to agitate and circulate the egg white within the vat so as to distribute the acid throughout the entire mass. The acid may be added over a period of about 20 minutes and the agitation by the device 12 then continued.

The fresh egg whites are quite viscous and it will be found that in the initial stages of hydrolysis by acid, the material becomes even more viscous, reaching a maximum viscosity in a few minutes after the acid has been added. Thereafter the viscosity of the material decreases and after about one hour the hydrolysis will be substantially complete and the viscosity of the mass will be substantially that of water.

Soon after the addition of the acid a scum 16 will form on top of the egg mass, and this scum contains certain insolubles such as chalaza and stringy portions of the egg white, as well as a small amount of foam. It is desirable to keep the foam down to a minimum, and for this reason the propellers 15 should be well under the surface of the mass so as not to produce too much surface agitation. The scum 16 will reach a maximum depth of about 4 to 7 inches in about two hours under the specific conditions above given.

As shown more clearly in Figure 1 of the drawing, the rotation of propellers 15 serves to propel the egg white liquid in a circular motion about the sides of the vat as indicated by the arrows 17 in Figure 1, and this circular motion of the liquid causes the material to move outwardly toward the circumference of the vat, and form a vortex on the surface of the liquid which has its center near the center of the vat. Also as seen more clearly from Figure 2 of the drawing the propellers 15 tend to drive the liquid downwardly at an angle with the vat bottom as well as about the sides of the vat, and this is advantageous in increasing the tendency to form minor circulating pools within the mass which is circulating as a whole. These minor whirlpools are indicated generally in Figure 1 by the curled arrows 18. These whirling bodies of liquid are very effective to pull the scum 16 down under the surface and disperse it throughout the mass. As schematically illustrated in Figure 2, the vortices produce openings 20 extending down into the liquid and through which the scum may pass into the egg mass. The speed and position of the propellers 15 should be so adjusted to produce whirlpools sufficiently violent to draw the scum under the surface but should not be so violent as to draw too much air also since if too much air is drawn in in this way objectionable foaming may result. Under the specific conditions given in this specific example, substantially all of the scum and foam will have disappeared from the surface in about six hours.

Preferably this same type of agitation is then continued during the subsequent fermentation period of the particular process given in this example, as it is necessary to maintain the insoluble matter in suspension until the egg material is dried. The length of the fermentation period in the process given will generally be between 60 and 120 hours.

The fermented egg material may then be discharged through the line 19 and dried in a suitable spray drying apparatus not shown, the insoluble material being dried along with the rest of the product while still in suspension.

The circulation of the egg material as herein set forth is particularly advantageous in those processes where fermentation is employed as in the foregoing example, for when the scum is drawn down at the centers of the whirlpools or vortices, a certain amount of air is drawn in at the same time and the air so introduced into the egg white mass raises the oxygen tension, thus creating a condition less favorable to anaerobic bacteria, and this tends to further improve the final dried product.

It should be understood however that the circulation as herein set forth can be used with benefit where fermentation is not utilized, and in those processes also my improvement can be availed of to disperse the scum and thereby eliminate waste of material. For example, the process set forth in Rosner 2,059,399, can be modified by circulating the acidified egg white material in the manner herein described to disperse the scum there formed; and then the whole egg white material can be dried without the removal of any scum. This improvement obviously represents a considerable saving of material.

In circulating the material within the vat the propellers 15 serve to push the material at an inclined angle against the sides of the circular vat, and this action taken with the curvature of the sides, causes the whole egg white mass to whirl, the top surface then assuming the form of a vortex, being slightly lower at the center of the vat. The large vortex thus formed and each of the numerous minor whirlpools or vortices, serve effectively to draw down the scum and foam into the mass. The circulating movement of the egg white mass is also effective to sweep clean any insoluble matter from the bottom of the vat.

Though I have given only one specific example of carrying out the improved process, it will be apparent to those skilled in the art that my improvement might be utilized in connection with other specific processes and that various changes and modifications may be made without departing from the spirit of the invention. The foregoing detailed description has been given for purposes of explanation only, and no unnecessary limitations should be understood therefrom.

I claim:

1. In the treatment of egg whites preparatory to drying wherein a scum containing insolubles is formed on the surface of the egg whites, the step of propelling said egg whites in a whirling motion to produce a whirling pool of egg white material for drawing said scum down into the egg white mass.

2. In the treatment of egg whites preparatory to drying wherein insolubles tend to separate from the soluble portions of the egg white mass, the step of circulating said mass to form a whirlpool of egg material to disperse said insolubles throughout said mass.

3. In the treatment of egg whites preparatory to drying wherein insolubles tend to separate from the soluble portions of the egg white mass, the step of circulating said mass in a vat of circular cross section to form a whirlpool bounded by the tank sides and effective to maintain said insolubles in dispersed condition throughout said mass.

4. In the treatment of egg whites preparatory to drying wherein insolubles tend to separate from the soluble portions of the egg white mass, the step of circulating said mass in a vat of circular cross section to form a whirlpool bounded by the tank sides while propelling said mass in a direction inclined with the bottom of said vat to accentuate the formation of smaller whirlpools within said whirlpool bounded by the tank sides.

5. In the treatment of egg whites, the steps of acidifying a mass of egg whites in a vat of circular cross section, propelling said mass in a whirling movement within said vat to disperse insolubles throughout the mass and maintain the vat bottom free of separated matter, and drying said mass while said insolubles are in dispersed condition.

NORMAN C. FISCHER.